United States Patent Office 3,235,524
Patented Feb. 15, 1966

---

3,235,524
PROCESS FOR CONVERSION OF NON-FUSIBLE AND INSOLUBLE POLYACROLEINS WITH SULFUROUS ACID OR BISULFITES
Werner Kern, Mainz, Otto Schweitzer, Konigstein, Taunus, and Rolf Schulz, Mainz (Rhine), Germany, assignors to Deutsche Gold- und Silber-Scheideanstalt vormals Roessler, Frankfurt am Main, Germany
No Drawing. Filed June 12, 1962, Ser. No. 201,754
Claims priority, application Germany, Mar. 23, 1955, D 20,095; Jan. 21, 1956, D 22,164
4 Claims. (Cl. 260—29.6)

This application is a continuation-in-part of application Serial No. 573,349, filed March 23, 1956, now abandoned.

The present invention relates to a process for the treatment of non-fusible homopolymers of acrolein which contain substantially no free aldehyde groups and which are normally insoluble in normal organic solvents to convert them into more valuable products and especially products which are soluble in a number of solvents.

It is known that unstabilized acrolein spontaneously polymerizes upon standing to produce a solid, non-fusible and insoluble product which has been designated as "disacryl." (Redtenbacher, Liebigs Ann. Chem. 47 (1843), p. 113.) Acrolein furthermore polymerizes under the influence of radical forming catalysts to produce infusible polymers which are insoluble in the known organic solvents. It, therefore, was previously assumed that hardly any double bonds or aldehyde groups were retained in such polymers and that therefore the polyacroleins are unsuited for the production of polyaldehydes (Houben-Weyl, vol. VII, pages 133-135). It was only in certain oligomers of acrolein (Gilbert, Donleavy, J. Amer. Chem. Soc. 60 (1938), p. 1911) and certain copolymers of acrolein with other vinyl compounds that reactivate aldehyde groups could be ascertained. The homopolymers of acrolein were previously considered rather unreactive and achieved no technical significance (Schildknecht, Vinyl and Related Polymers, Wiley and Sons, New York, 1952, page 700).

According to the invention it was unexpectedly discovered that the homopolymers of acrolein contrary to prior indications do contain aldehyde groups but that these are in the form of aldehyde-hydrate-ether groupings and therefore not free and that the intermolecular ether groupings are the cause of the cross-linking and therefore their infusibility and insolubility, as indicated in the following formula:

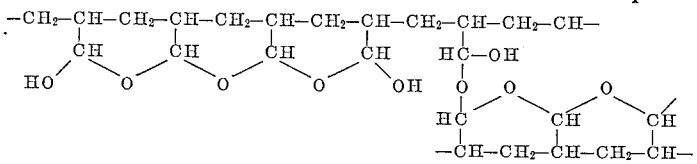

Furthermore, according to the invention it was found unexpectedly that these masked aldehyde groups which are present in all such macromolecular homopolymers of acrolein which are infusible and normally insoluble in all common organic solvents and which are produced by spontaneous or radical polymerization using radical forming catalysts such as redox systems and are macromolecular, having molecular weights above 10,000 (see Staudinger, Makromolekulare Chemie & Biologie, page 4, 1947, Basel), can be caused to react with sulfurous acid and aqueous bisulfite solutions, especially of alkali metal bisulfites, at a pH between 1 and 6.

It was surprising that it is possible to react the infusible, insoluble homopolymers of acrolein obtained by spontaneous or radical polymerization under the heterogeneous reaction conditions required. That is, the polyacrolein at the beginning of the reaction is present in solid undissolved form and only the resulting derivative goes into solution as the reaction proceeds. The sulfurous acid or bisulfite polyacrolein adducts formed are soluble in water, as well as in the reaction solution, whereas the starting polyacroleins are insoluble in water, as well as common organic solvents.

The reactions according to the invention can be carried out at room temperature but moderately raised temperatures expedite the reactions. Temperatures over 150° C. can engender side reactions which may cause the reaction product to lose its stability. For convenience, it is preferable to employ temperatures not over the normal boiling point of the aqueous sulfurous acid or bisulfite solutions employed for the reaction.

In the reactions according to the invention the polyacroleins employed are not degraded to form monomeric acrolein and therefore the polyacroleins do not serve as a source of monomeric acrolein.

When the infusible polyacroleins obtained by radical or spontaneous condensation which are concerned according to the invention are treated with a sufficient amount of an aqueous $SO_2$ solution at a pH of 1 to 6, the polyacrolein is converted even at room temperature to a form which is soluble in such solution. The viscous solutions thus obtained can be evaporated to dryness whereby glass clear solid products are obtained. Upon evaporation of such solutions any free $SO_2$ contained therein is removed to a large extent. Upon increase in concentration of the solution, it first becomes highly viscous. The solid glass clear product remaining after completion of the drying was rather insoluble in being stable against most of the common organic solvents and also against water. Increases in temperature do not substantially alter the solubility characteristics of the solid product. A certain amount of sulfur, for example, about 8.7%, can be determined in the dried solid product which is derived from the $SO_2$ bound in the polyacrolein.

As the aqueous solutions produced by the treatment of acrolein polymers with aqueous $SO_2$ form an insoluble film merely upon drying at room temperatures, they are advantageously used as adhesives, as the adhesive film obtained is stable against moisture.

These aqueous solutions furthermore are miscible with plasticizers, such as glycerine or other polyalchohols. Pigments and fillers can also be incorporated therein. They are also capable of being cut or mixed with aqueous solutions of water soluble high molecular weight compounds or aqueous dispersions or emulsions. The acid hydroxyl groups of the bound sulfurous acid can be neutralized with inorganic bases or amines. The pH value of the products furthermore, depending upon the requirements, can be adjusted either on the acid or alkaline side. The residual aldehyde groups of the polyaldehyde are to a greater part available for all usual aldehyde reactions and the residual aldehyde-hydrate-ether groups are also capable of being split in the usual manner.

The aqueous solutions resulting from the treatment of the acrolein polymer with aqueous $SO_2$ are especially adapted for the treatment of textiles, films and leather substitutes. For example, solutions containing only a few percent of the solubilized acrolein polymer suffice for the surface treatment of fabrics. They also are adapted for the treatment of animal hides as well as leathers which already have been tanned, either alone or in conjunction with other tanning assistants. The solutions are also adapted for addition to aqueous solutions of urea or melamine resins, as well as to aqueous solutions of natural proteinaceous substances, such as gelatin or casein. Also, phenol resins can be cut with such solutions. They are furthermore suited for addition to natural or syntheic rubber latices or concentrates thereof, as well as to synthetic resin emulsions of all types.

Even after drying the aqueous acrolein polymer solutions obtained with the aid of $SO_2$, the aldehyde groups retained in the solid product are to a certain extent available for reactions characteristic of aldehyde groups.

It is also possible to react the acrolein polymer to a limited extent with sulfurous acid so that only a limited portion of the macromolecule reacts therewith and then to react a portion of all of the remaining reactive groups with other aldehyde reactive substances.

The following examples will serve to illustrate several embodiments of the invention:

Example 1

1 gram of polyacrolein obtained by spontaneous polymerization was suspended in 30 cc. of an aqueous sodium bisulfite solution (d=1.325) and the suspension heated with stirring on a water bath to 55–60° C. After about 1 hour, a homogeneous, slightly cloudy viscous solution resulted. When this solution was diluted with 20 cc. of water and centrifuged, a clear colorless to weakly yellow solution was obtained. This solution was dialysed to separate the excess bisulfite and the dialysed solution exhibited characteristic color reactions for aldehydes.

Example 2

1 gram of polyacrolein obtained by spontaneous polymerization was heated for 1 hour with 10 cc. of water and 5 cc. of concentrated sodium bisulfite solution at 60° C. with stirring. After cooling, the small quantities of undissolved components were filtered off and 10 cc. of water, 5 cc. of 2 N NaOH and a concentrated aqueous solution of 2.4 grams of KCN were added thereto. The resulting solution was allowed to stand 24 hours at room temperature. Thereafter, dilute acetic acid was added and upon approaching neutralization, the reaction product precipitated out. In freshly precipitated condition it is soluble in pyridine, in γ-butyrolactone and in dilute aqueous sodium hydroxide. After a number of reprecipitations, it contained 5 to 6% of nitrogen.

Example 3

7.5 grams of polyacrolein produced by spontaneous polymerization were mixed with a solution of 18.5 grams of $SO_2$ in 100 cc. of water. After standing for three days at room temperature, the polymer had completely dissolved to produce a viscous clear colorless solution. Upon evaporation of the water from such solution, the $SO_2$ employed for preparing the solution and eventually any excess of $SO_2$ was removed to a large extent. Upon increase in concentration of the solution, it first became highly viscous and upon complete drying a glass clear solid product was obtained which was rather insoluble in being stable against most of the known solvents and also against water. An increase in temperature did not substantially alter the solubility of the solid product. It contained 8.7% of bound sulfur derived from the bound sulfurous acid.

Example 4

1 part by weight of a polyacrolein obtained by redox polymerization of acrolein in an aqueous medium with a redox system composed of potassium persulfate and silver nitrate was added to 10 parts by weight of an 8% aqueous solution of sulfurous acid obtained by introducing $SO_2$ in distilled water. The mixture was allowed to stand at room temperature. It immediately formed a viscous jelly like mass which turned into a viscous solution in the course of 24 hours.

We claim:

1. A method of converting a macromolecular infusible, insoluble homopolymer of acrolein only, substantially deviod of free aldehyde groups, selected from the group consisting of polyacroleins produced by spontaneous polymerization and polyacrolein produced by radical polymerization into a product soluble in aqueous solutions of sulfurous acid which comprises reacting such homopolymer with an aqueous solution of a sulfurous compound selected from the group consisting of aqueous solutions of sulfurous acid and aqueous alkali metal bisulfite solutions under acid conditions at a temperature between room temperature and 150° C., the quantity of aqueous solution of sulfurous compound being sufficient to dissolve the reaction product.

2. A method of converting a macromolecular infusible insoluble homopolymer of acrolein only, substantially devoid of free aldehyde groups, selected from the group consisting of polyacroleins produced by spontaneous polymerization and polyacroleins produced by radical polymerization into a product soluble in aqueous solutions of sulfurous acid which comprises reacting such homopolymer with an aqueous solution of sulfurous acid at a temperature between room temperature and 150° C., the quantity of aqueous solution of sulfurous acid being sufficient to dissolve the reaction product.

3. The reaction product of the homoplymer of acrolein and the aqueous solution of the sulfurous compound of claim 1.

4. An aqueous sulfurous acid solution of the reaction product of the homopolymer of acrolein and sulfurous acid solution of claim 2.

References Cited by the Examiner

UNITED STATES PATENTS

| | | | |
|---|---|---|---|
| 2,657,192 | 10/1953 | Miller et al. | 260—67 |
| 3,036,978 | 5/1962 | Kern et al. | 260—73 |
| 3,068,203 | 12/1962 | Schweitzer | 260—67 |
| 3,079,296 | 2/1963 | Houff et al. | 260—67 |
| 3,079,357 | 2/1963 | Fischer | 260—67 |

WILLIAM H. SHORT, *Primary Examiner.*

JOSEPH R. LIBERMAN, *Examiner.*